UNITED STATES PATENT OFFICE.

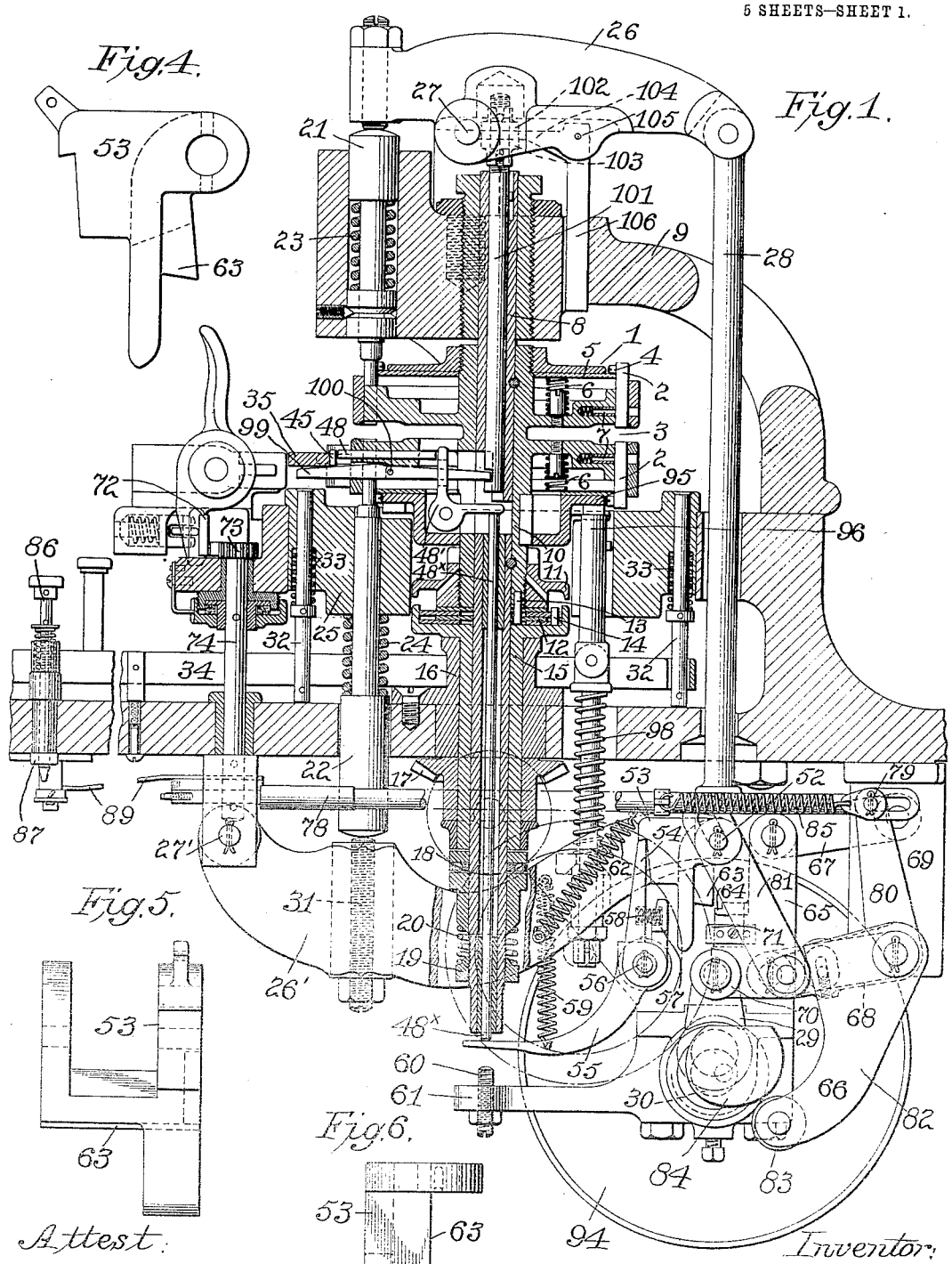
U. G. LEE.
KEYBOARD TYPOGRAPH.
APPLICATION FILED JUNE 28, 1912.
1,051,241.
Patented Jan. 21, 1913.
5 SHEETS—SHEET 1.

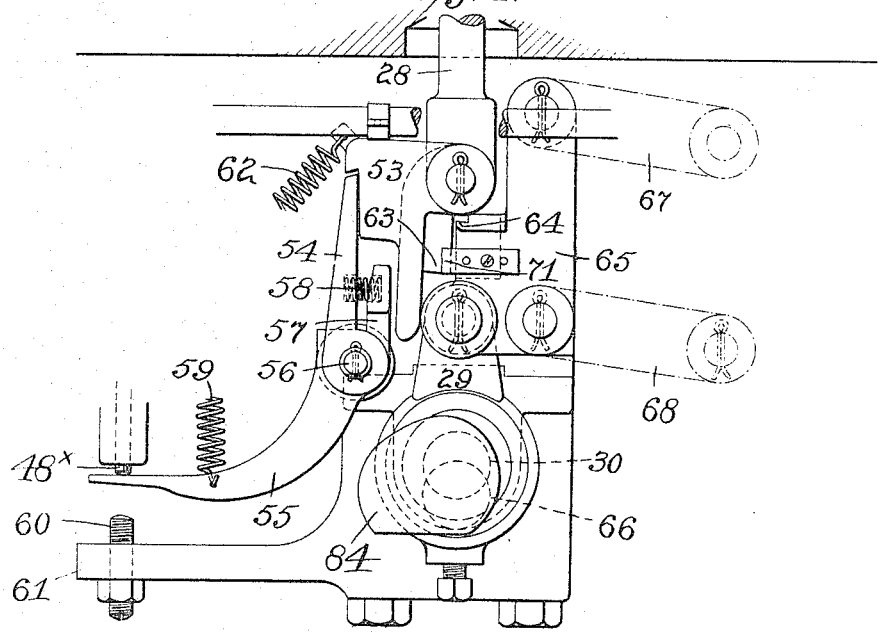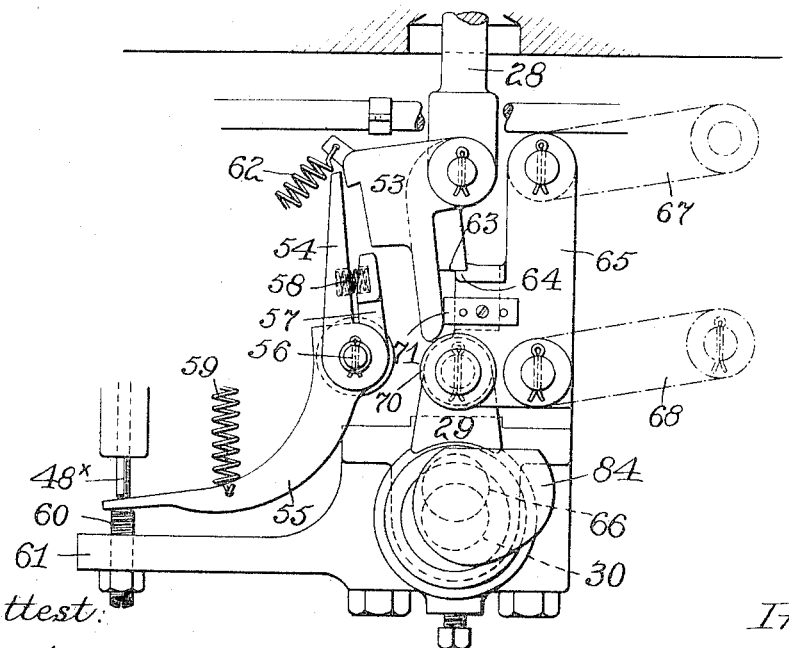

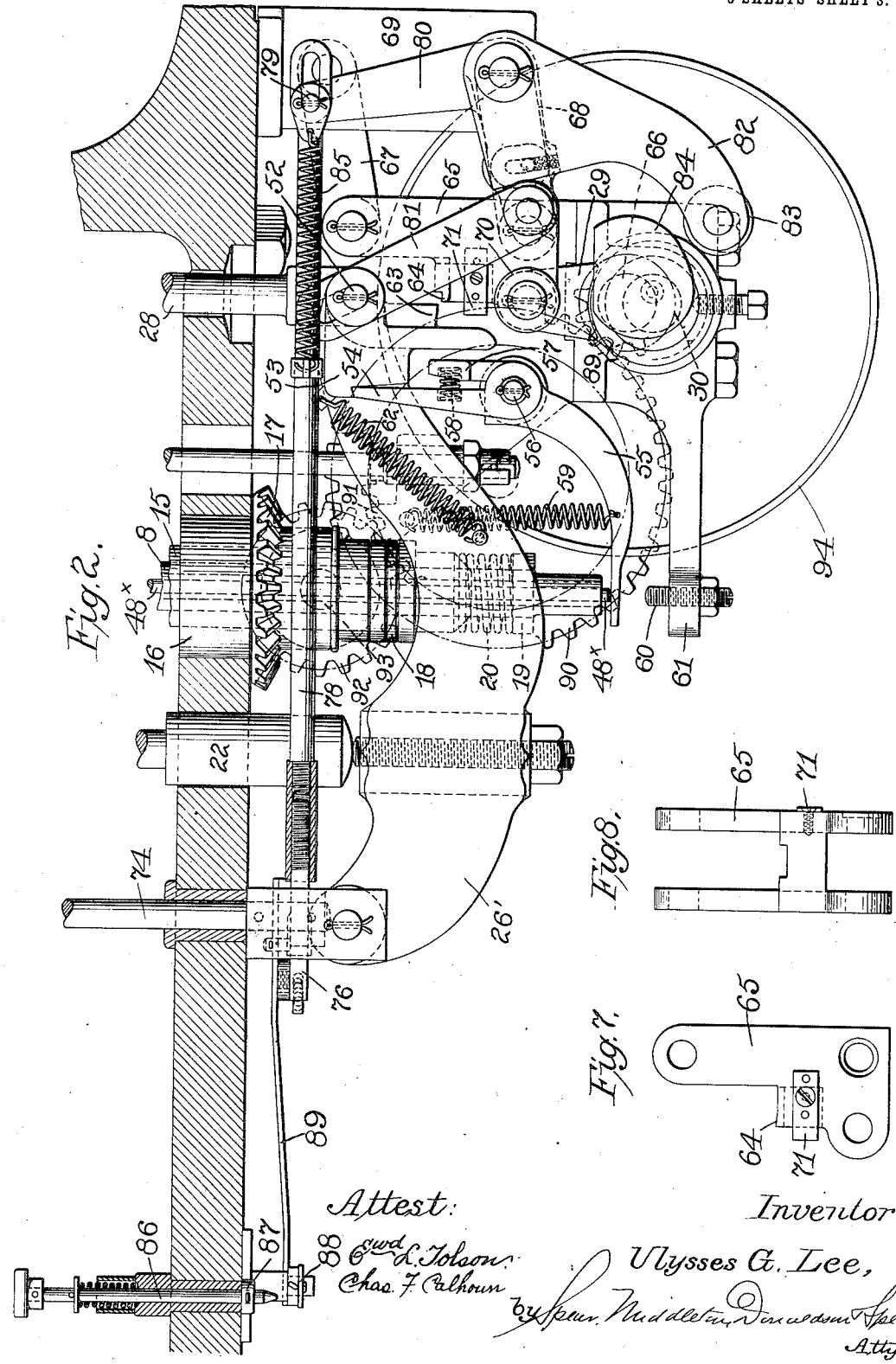

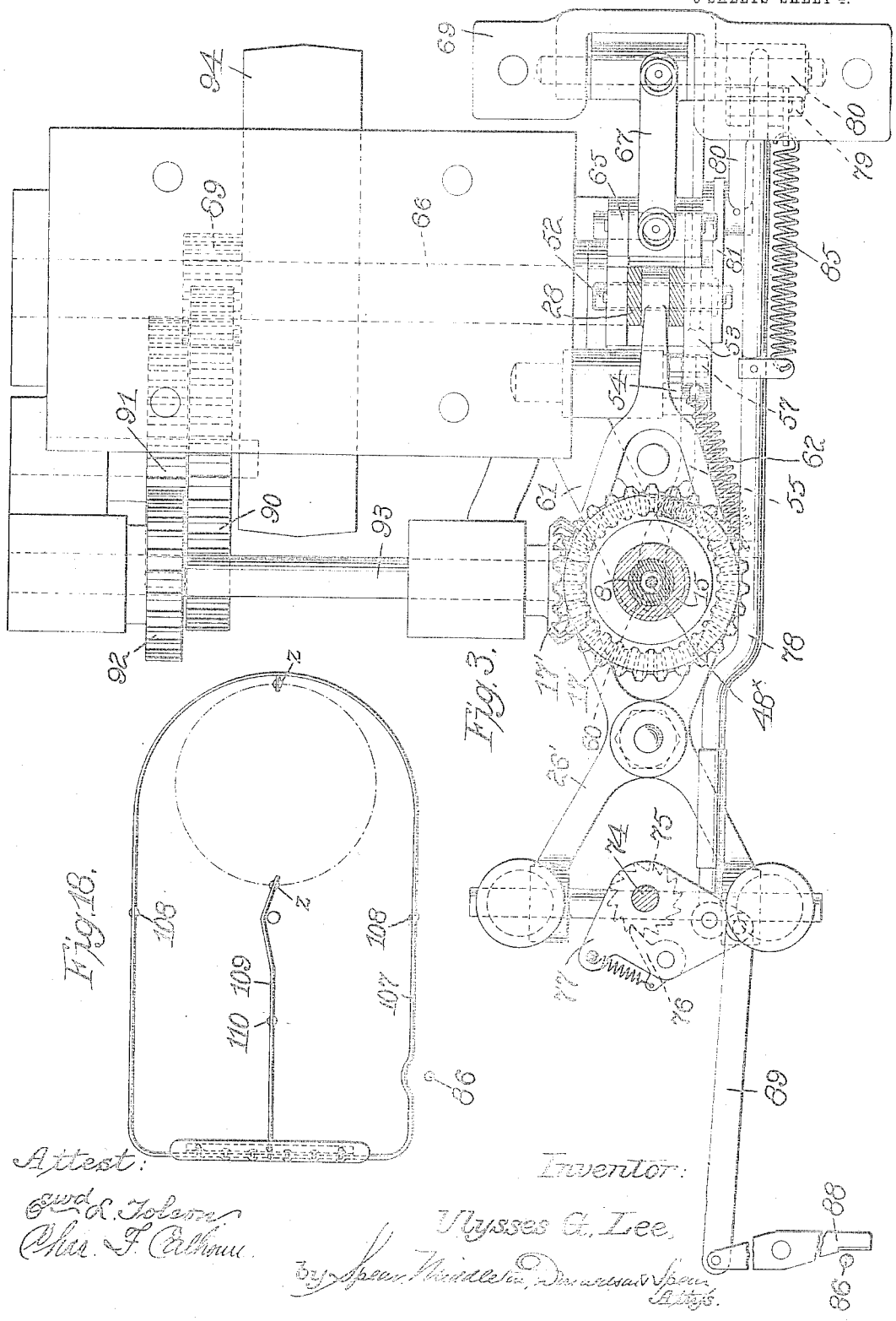

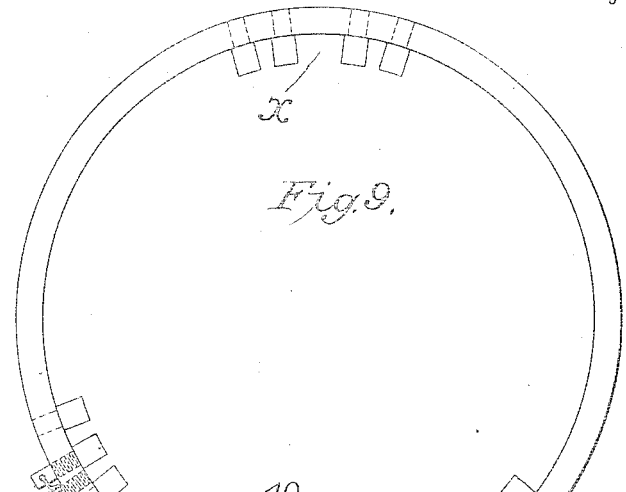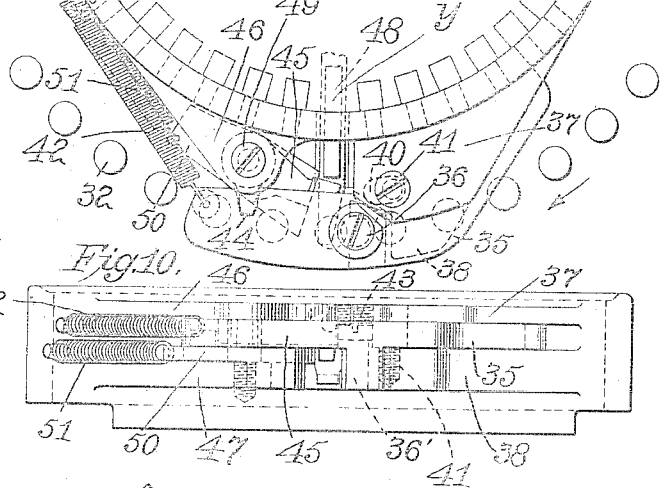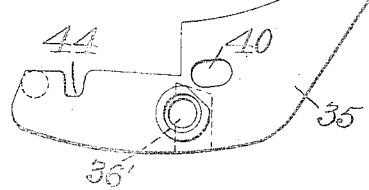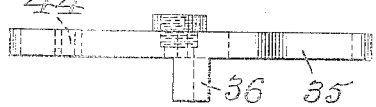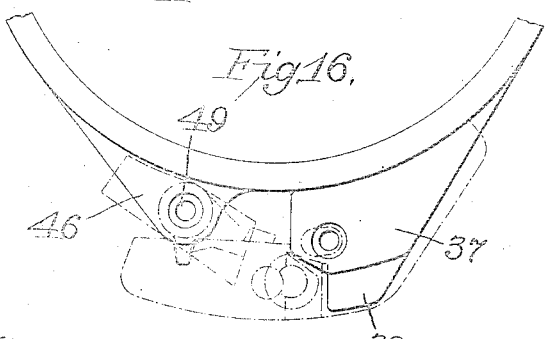

ULYSSES G. LEE, OF CHATTANOOGA, TENNESSEE, ASSIGNOR TO MONTAGUE MAILING MACHINERY COMPANY, A CORPORATION OF TENNESSEE.

KEYBOARD-TYPOGRAPH.

1,051,241.      Specification of Letters Patent.      Patented Jan. 21, 1913.

Application filed June 28, 1912. Serial No. 706,522.

*To all whom it may concern:*

Be it known that I, ULYSSES GRANT LEE, citizen of the United States, residing at Chattanooga, Tennessee, have invented certain new and useful Improvements in Keyboard-Typographs, of which the following is a specification.

My invention relates to typograph machines for embossing metal plates of the general type disclosed in Letters Patent of the United States granted to Charles Owens, January 25, 1910, #947,254, and 947,397, and in application filed by me April 26, 1911, #623,486.

One object of my present invention is to prevent the embossing of a character when a key is partially depressed, for instance, by being struck an accidental blow, or when a key is given a quick blow. In carrying out this part of my invention, I arrange between a power shaft and the die operating punches, connections which are held normally inactive, but which, when thrown into operative position, transmit the power from said shaft to the punches. In throwing these connections into operation, there are two controlling factors; the selected key at the key board must be depressed and the power shaft must have reached a certain predetermined point in its revolution, as the setting of the power transmitting connections in operative position depends upon the combined control of the selected key and a member moved by the shaft. The depressed key must, therefore, be held depressed until the shaft in its revolution reaches a certain point in its revolution. Any quick stroke, such as an accidental stroke of a key or a partial stroke and a quick release will not be effective.

Other important objects of my invention and features employed for carrying out said objects will be clear from the following specification.

In the drawings Figure 1 is a central vertical section through the machine with parts in elevation; Figs. 1ᵃ and 1ᵇ are detail views of parts shown in Fig. 1, but in different positions; Fig. 2 is an enlarged view of the lower part of Fig. 1; Fig. 3 is a plan view of the parts shown in Fig. 2, partly in section; Figs. 4, 5 and 6 are views of the connector; Figs. 7 and 8 are views of the cross head for operating the connector; Fig. 9 is a plan view of a portion of the carrier for the dies and the key operated stop pins and the controlling and coacting stop means on the carrier; Fig. 10 is a side elevation of the parts shown in Fig. 9; Fig. 11 is a plan view of the die carrier stop and controller device; Fig. 12 is an edge view of the parts shown in Fig. 11; Figs. 13, 14 and 15 are details relating to the die carrier stop; Fig. 16 is a plan view of a portion of the carrier showing the supports thereon for the devices carried thereby, which are shown in dotted lines; Fig. 17 is a plan view of a supplemental controller; Fig. 18 is a diagram of the space frame.

In these drawings, 1 indicates a die carrier having upper and lower portions, each portion carrying a series of dies 2 slidable vertically in relation to the die carrier to act upon the metal address plates which are positioned in the space 3 between the upper and lower portions of the die carrier. These dies have screws 4 bearing upon plates 5 mounted upon springs 6 on the die carrier, whereby the dies are held in retracted position normally, but are capable of being moved to make the impression on the address plate. The dies are further controlled by spring pressed plungers 7 bearing frictionally thereupon. The die carrier is pinned to a hollow shaft 8 which extends through a bearing in the bracket 9 forming part of the framework, and also through the lower part of the framework. The die carrier has a downwardly extending sleeve 10 surrounding the hollow shaft, and at its lower end it carries a friction clutch member 11, and below this member there are a series of friction plates 12, some of which are secured to the clutch member or to the lower end of the sleeve 10 by a pin 13, and others of these plates which alternate with those first mentioned are secured by a pin 14 to a clutch member 15 in the form of a collar and sleeve, which sleeve surrounds the hollow die shaft 8 and has a bearing 16 in the lower part of the machine frame. The lower end of this sleeve has keyed thereto a bevel gear wheel 17 by which the sleeve 15 and the lower clutch member is driven, the gear 17 being driven by another gear 17′ driven from the main crank shaft of the machine through a train of gears.

At the lower end of the clutch sleeve 15 a ball bearing 18 is arranged surrounding the hollow die shaft, this ball bearing having interposed between it and a collar 19 pinned to the die shaft a spring 20. This spring, by pressing the die shaft downwardly and by pressing upwardly upon the lower clutch sleeve or member 15 by way of the ball bearing, serves to press the friction clutch plates together, and the ball bearing serves to take the friction which would otherwise exist between the spring and the lower clutch member 15. The dies are operated by plungers 21 and 22, the upper plunger 21 being guided in the bracket 9, and normally pressed upwardly by a spring 23, while the lower plunger is normally pressed downwardly by a spring 24 interposed between it and the central portion 25 of the fixed framework. The upper plunger is moved downwardly by a lever 26 pivoted to the bracket 9 at 27, and having its rear end connected with a link or rod 28, which is operated, as will be hereinafter described, from an arm 29 connected with the crank pin 30. The lower plunger is operated by a lever 26' pivoted at its forward end 27' to a suitable part of the fixed frame, said lever having an adjustable screw 31 at a point intermediate of its length to bear on the lower plunger 22. Stop pins 32 are guided vertically through the main frame portion 25, being normally depressed by springs 33, the said stop pins being connected with the key levers 34 to be operated thereby. When a key is depressed, the corresponding stop pin is raised so that it will arrest the rotary movement of the die carrier as will be presently described, and then the die plungers are operated so that the dies which have been brought into proper registration with the address plate by the action of the stop pin will be operated to emboss the proper character upon the said address plate. For arresting the movement of the rotary die carrier, I provide on the said carrier an anvil or stop 36, Fig. 9, on a controller member 35 mounted slidably on the carrier between the flanges 37, 38, Fig. 10. This controller is slotted at 40 and is held in place by a pin 41 passing through the slot and the flanges. The controller is drawn to the left by a spring 42 connected with the carrier. The anvil or stop 36 consists of a headed pin 36', Fig. 14, seated in a recess of the controller, wherein it is held by a screw threaded member 43 bearing thereon. The anvil has a curved recess forming the face to contact with the stop pins 32. The controller has a single notch 44 engaged by a trip lever or supplemental controller 45 pivoted between the flanges 46, 47. This supplemental controller engages a rod 48 extending radially inward of the die-carrier which, when operated, sets in motion the die operating mechanism, through a bell crank lever 48' and vertical rod 48$^x$, as will be described hereinafter. This trip or supplemental controller is pivoted on the shoulder screw 49. On this same screw is pivoted a rebound dog 50, the outer end of which lies normally in the vertical plane of the circle of stop pins 32. This dog is yieldingly held in this position by a spring 51 connected to the die carrier. This mechanism works as follows: Supposing the die carrier is in rotation through the friction clutch 11, 12 in the arrow direction, Fig. 9, above described; when a key lever 34 is depressed and its corresponding stop pin 32 is thereby raised, the first part on the die carrier to strike the stop pin is the rebound dog 50, which immediately yields and passes the stop pin, and thereupon the spring 51 returns the rebound dog outwardly with its end alongside the elevated stop pin to prevent rebound of the carrier when arrested. In the meantime, the anvil or stop 36 on the slidable controller 35 has struck the elevated stop pin 32 to thereby arrest the die carrier. We then have the carrier held by the anvil 36 and the rebound dog 50 engaging opposite sides of the elevated stop pin 32. Rebound is prevented and as the die carrier is constantly under the influence more or less of the friction clutch at 11, 12, tending to turn it, the die carrier will be held accurately and firmly in position for the embossing action which now takes place through the operation of the dies, as will be presently described. When the anvil or stop 36 strikes the elevated stop pin 32, the slide or controller 35 will slide to the right in relation to the carrier, this being permitted by the slot and pin connection at 40, 41, and as this movement takes place against the tension of the spring 42, a cushioning effect will be secured while the spring 42 is being stretched to the extent allowed by the length of the slot 40. This will relieve the parts of shock when the carrier is arrested, the accurate position of the die carrier being determined by the pin 41 reaching the end of the slot 40.

The sliding controller 35 performs another function besides that of acting as a cushioning or yielding stop means for arresting the die-carrier, namely: it controls the operation of the die mechanism for which purpose the trip or supplemental controller lever 45 is moved inwardly by the notch and tooth connection at 44, with the sliding controller, and thus the bell crank 48', Fig. 1, is operated to force downwardly the rod 48$^x$, which rod at its lower end acts upon the die operating mechanism to set it in motion while the key lever 34 is held down.

As before stated, the upper dies are operated by a plunger 21, through lever 26, and rod 28, while the lower dies are operated by plunger 22 through a lever 26'. The lower end of the rod 28 and the free end of the lever 26' are connected together at 52 pivotally, and on the same pin is mounted the latch or connector 53, which determines by its position whether or not the power from the main drive shaft shall be transmitted to the die operating connections, including the rod 28 and lever 26'. This connector or latch is held in its inactive position shown in Fig. 1 by a detent lever consisting of the two arms 54, 55, pivoted at 56 to a suitable part of the frame, the arm 55 having an extension 57 between which and the arm 54 a spring 58 is interposed. The lower arm 55 of the detent is engaged by the axial rod 48$^x$ to be operated thereby. The detent lever 54, 55 is pressed into the position shown in Fig. 1 by a spring 59. Its movement, when operated by the rod 48 in opposition to the spring 59, is limited by a set screw 60 on a bracket 61 of the frame. The latch or connector is pressed by a spring 62 which, in the position of the parts indicated in Fig. 1, keeps the connector pressed firmly in engagement with the upper beveled end of the detent lever, the latch having a correspondingly beveled tooth or projection, the engagement being such that under the pressure of the spring 62 the upper end of the detent will be retained in connection with the latch until such time as the latch is positively operated and released from the control of the detent 54, 55. When so released, the latch or connector will turn on its pivot under the action of the spring 62, and its tooth 63 will then be in the path of the tooth 64 of a constantly reciprocating cross head 65, so that this cross head, on its upward movement, will engage and raise the latch or connector and with it the rod 28 and lever 26', thus effecting the operation of the upper and lower die. The cross head 65 is connected to the arm or link 29 which is operated vertically from the crank pin 30 of the main shaft 66, and thus the cross head derives its motion. It is controlled or directed in this upward movement by parallel links 67, 68, pivotally connected thereto and to the frame bracket 69. The operation of this die operating mechanism is as follows: The main shaft 66, through its crank 30 and arm or link 29, gives a constant vertical reciprocation to the cross head 65, but while the latch or connector 53 is in the position shown in Fig. 1, this movement of the cross head will be without effect on the die operating connections, because the tooth 63 of the latch or connector will not be in line with the tooth on the cross-head. If, however, a finger key lever 34 is operated, the die carrier will be arrested by the appropriate stop pin 32, and the rod 48$^x$ being operated as above described, the arm 55 of the detent lever will be pressed down and the spring 58 will be compressed between the extension 57 of said arm and the arm 54 of the detent, because the latter arm will be held by the beveled tooth of the latch 53. If the key lever 34 is held down long enough, the latch or connector will be turned on its pivot by a roller 70 on the cross head as this cross head and crank rise from their low position of Fig. 1, and therefore the detent arm 54, under the action of the spring 58 (which has been held under compression so long as the key lever is pressed down), will move leftward, Fig. 1. Now, upon the downward movement of the cross head and crank, the roller 70 will leave the latch or connector and this, under the action of its spring 62, will be swung to the right so that its tooth 63 will be engaged by the tooth 64 of the cross head on the next rise of the same, and thus the connector will be lifted, together with the rod 28, and lever 26', through which the upper and lower dies will be operated.

It will be seen from the above that it requires the combined and simultaneous action of the key lever 34 and the roller 70 of the cross head to effect the freeing of the detent 54, 55, or rather the release of the connector or latch 53 from the detent 54, 55, and the setting of said latch or connector in position to be operated by the cross head when next it rises. If a quick or accidental blow is given one of the keys resulting in the immediate return of the key and rod 48$^x$ to normal position before the latch or connector is operated by the cross head roller 70, the action will be ineffective, because when the lever 55 is pressed down by the rod 48$^x$ this action will result only in compressing the spring 58, but not the movement of the arm 54 away from the latch because the pressure of the spring 58 is not sufficient to overcome the holding action of the beveled engaging surfaces of the arm 54 and the tooth on the latch under the action of the spring 62. Consequently, this quick movement of a key lever will result in nothing.

Fig. 1$^a$ represents the relative positions of the detent lever 54, 55, the latch or connector and the cross head with the cross head up and the connector swung so as to free the detent lever. If, at this time, a key lever 34 is pressed down or was previously pressed and held down, the detent lever arm 54, will move from under the tooth of the connector so that as the cross head goes down, as shown in Fig. 1$^b$, the connector will swing to the right from the position of Fig. 1$^a$ to the position of Fig. 1$^b$, its tooth 63 will now overlie the tooth 64 of the cross head 65, and as the cross head rises, the connector will be moved up, thus causing the operation of the rod 28 and the lever 26', and the movement of the dies to make the impression.

It will be seen from the above that the die operating connections can not be set in motion if the action of the key lever 34 and consequently the action of the detent lever 54, 55, is at all uncertain, such as would result from a partial blow upon the key lever or a quick accidental stroke. In other words, it is necessary that the key lever 34 and the detent arm 55 be depressed and held down until the crank with the cross head has reached a certain position before the release of the connector can be accomplished.

Sometimes in practice it may happen that the operator only partly depresses a key, which will result in the depression of the rod 48ˣ due to the anvil or stop on the controller 35 striking the stop pin 32 a glancing blow. The die carrier will not be arrested, and unless my present arrangement were used the wrong letter would be embossed. With the mechanism described above it is practically impossible to emboss a letter not wanted.

Briefly stated, the operation is as follows: When a key lever 34 is pressed and held down with the parts in position shown in Fig. 1, which shows the crank and cross head down, the arm 55 of the detent 54, 55, will be pressed down by the rod 48ˣ, the spring 58 will be compressed, but the arm 54 will not be moved because it will be retained by the tooth of the connector under the action of the spring 62, until the roller 70 on the cross head engages and swings the connector leftward. This releases the arm 54, which then assumes the position of Fig. 1ᵇ. When the crank and cross head reach the lower end of their stroke, the connector 53 swings to the right against the stop 71, and the connector will then be engaged by the cross head for one revolution of the crank. When the cross head again approaches its lower position, the arm 54 having assumed its normal position engages the connector and releases it from the tooth 64 of the cross head. This completes the operation of making an impression.

The carriage for the address plate blanks to be embossed is shown generally at 72, operated from a pinion 73 on a vertical shaft 74. The lower end of this shaft has a ratchet wheel 75 engaged by a pawl 76 on a plate 77 pivoting about the axis of the ratchet wheel. The pawl plate is operated by a rod 78 connected by a pin and slot at 79 with a two-armed lever 80 pivoted on the bracket 69. A spring 85 is connected to the rod and to the lever. This lever is connected by a link 81 with the pivot of the connector, the link being slotted to receive the pivot pin. The lever has fixed thereto adjustably an arm 82 carrying a roller 83 to be operated by the cam 84 on the main crank shaft. When the cross head 65 moves the connector 53 upwardly to operate the dies, the link 81 will be drawn up toward the end of the upward movement of the connector, or in other words, as soon as the pivot pin reaches the upper end of the slot in the link and consequently the upper end of the lever 80 will be moved toward the right and through the spring 85, the rod 78 will be drawn upon to move the pawl 76 backward for a new feeding action upon the plate carriage. This feeding action is performed as soon as the dies separate and during the downward movement of the connector and cross head by the cam 84 operating the arm 82 of the lever 80. This feeding stroke is a slow one, occupying nearly ¾ revolution of the main shaft and results from the action of the cam. This is desirable to prevent overthrow.

Sometimes it is desirable to operate the dies to make an impression without moving the blank carriage. For this purpose a spacing key is mounted on the keyboard, the stem of said key being shown at 86. This key and stem are held up normally by a compression spring with the collar 87 bearing against the under side of the bed. When non-spacing is desired, the non-spacing key is depressed so that its stem will oppose the movement of the lever 88 which is pivoted to the bed and connected by a link 89 with the pawl carrying plate 77. Backward movement of the plate to cause the pawl 76 to engage a new tooth in the ratchet 75 is therefore prevented even though the link 81 and lever 80 are operated, because the spring 85 will yield and the rod 78 will not be operated.

The gear 17 for rotating the carrier through the friction clutch above described is operated continuously through a train of gears from the main shaft 66, these gears being marked 89, 90, 91, 92, the last mentioned being on a shaft 93 which carries a bevel gear 17′ meshing with the bevel gear 17. The crank shaft 66 is continuously driven by a fly wheel indicated by the circle 94. I have provided an alinement wheel 95 keyed to the die carrier and having teeth on its under side to be engaged by an alinement detent 96 movable vertically through the center frame 25. This detent is moved upwardly at the proper time through any suitable operating means, a spring 98 being interposed between the detent and the operating means to allow the detent to yield if the said detent should strike the top of the tooth on the alinement wheel instead of the space between these teeth. This alinement detent is caused to engage the teeth on the alinement wheel just before the impression takes place, so that the die carrier will be accurately alined to make its dies register properly with the point on the address plate to be impressed or embossed. Owing to the fact that the spring 98 of the detent or alinement device is stronger than the spring 20 which presses the friction plates together, the action of the operating means of the detent results in a slight separation of the members of the friction clutch, so that little or no driving force is exerted to rotate the die carrier when this is arrested by the stop pin and properly alined by the alinement detent. The detent rod is operated from the lower punch operating lever 26' which has a lug through which the rod extends.

I have provided means for returning the stop pins positively to their inactive positions, consisting of a lever 99 pivoted at 100 to the die carrier, and having its outer end in position to overlie the stop pin when raised. This lever is operated to depress the stop pin positively by a rod 101 extending axially of the hollow die carrier shaft, and having its upper end provided with collars 102, 103, between which the forked end of a lever 104 engages, the lever being pivoted within a recess of the punch lever 26 at 105, and having a stem 106 passing down through a part of the bracket 9. The collars 102, 103, are adjustable on the screw-threaded end of the rod 101 in order to adjust the lever 104. Owing to the relation of the lever 104 with the punch lever 26, as the operating rod 28 moves upwardly, raising the outer end of the punch lever, the lever 104 is also carried upwardly, swings on its pivot, and carries with it the rod 101, thus elevating the inner end of the stop pin returning lever 99, and by the time the plungers or punches 21 and 22 have been brought together, the outer end of the depressor lever 99 has been made to travel a sufficient distance to force the stop pin into its inoperative position, and as the impression levers 26 and 26' are returning to their normal or inactive positions, the rod 101 is moved downwardly and thus throws the stop pin depressor lever 99 again into its normal position. At this time the detent 96 is holding the die carrier.

The stem 106 of the supplemental lever 104 works in an opening in the bracket 9 as before stated, and as the main lever 26 rises this stem, by working against the wall of the opening, will give an additional movement to the supplemental lever, i. e., about its pivot 105 to operate the depressor.

It will be observed, owing to the fact that the depressor lever 99 depresses the stop pin 32 at each impression upon the address plate, that as soon as the alinement detent 96 is drawn down from engagement with the alinement wheel 95 the die carrier is free to rotate as soon as the friction clutch members are returned to their frictional engagement.

It will be observed that the member 35 with its anvil or stop 36 carried thereon is what may be termed a combined stop and controller, in that it acts to stop the rotary carrier of the dies, and also to set in action the die operating means.

It will be seen from the plan view, Fig. 9, that there are two blank spaces, x and y, not occupied by any dies. One of these blank spaces is provided to allow room for the location of the lever 99 and the operating pin 48. Further, these blank spaces are concerned in the provision of means for spacing between words. It will be seen that the same movement of various of the parts must take place for spacing between words as takes place when characters are being embossed. When spacing between words is being done, however, no die operation is required. Therefore the dies are omitted at the two blank spaces x and y as mentioned above, and because the space key is used oftener than any other, two stop pins z are provided, these being located on opposite sides of the machine, but both are raised when the space key is depressed so that spacing between the words can be accomplished twice as quick as would be the case with only one stop pin. The spacing key is in the form of a bar, Fig. 18, connected by the frame 107 with one of the spacing stop pins, said frame being pivoted at 108. The other spacing stop pin is operated by a lever 109 pivoted at 110, which lever is operated from the space bar. By this arrangement the die carrier only makes one-half a revolution in spacing between words.

I claim as my invention:

1. In combination in apparatus of the class described, rotary die carrier means having pairs of coacting dies thereon, key operated stop pins on the supporting frame, die operating means, and a combined stop and controller on the die carrier means to contact with the key operated stops, said combined stop and controller having limited movement in arresting the carrier to thereby set in action the die operating means with which it is connected, substantially as described.

2. In combination in apparatus of the class described, rotary die carrier means having pairs of coacting dies, key operated stops on the supporting frame, a controller member mounted on the carrier, a stop on the controller member to contact with the key operated stop, said stop carrying member having limited yielding movement under restraint to cushion the blow, and die operating means set in action by the limited movement of said member, substantially as described.

3. In combination in apparatus of the class described, a rotary die carrier having pairs of coacting dies thereon, key operated stops on the supporting frame, a controller member mounted slidably on the carrier and having thereon a stop to contact with the key operated stops and arrest the carrier after yielding to the impact, and die operating means set in action by the sliding movement of the said controller, substantially as described.

4. In combination in apparatus of the class described, rotary die carrier means having pairs of coacting dies, key operated stops on the main frame, a controller member movably mounted on the carrier having a stop portion thereon to contact with the key operated stops to be moved by the impact, a supplemental controller mounted on the die carrier and operated by the main controller, and die operating means set in action by the movement of the supplemental controller, substantially as described.

5. In combination a die carrier, key operated stops, a controller slidably mounted on the carrier and having a stop portion to contact with the key operated stops and arrest the carrier and to be moved by the impact, a supplemental controller pivotally mounted on the carrier and connected with the main controller to be operated thereby when the main controller slides under impact of its stop portion with the key operated stops, and die operating mechanism controlled by the supplemental controller, substantially as described.

6. In combination die carrier means, key operated stops for arresting the carrier, die plungers, a power shaft, normally inactive power transmitting connections between the power shaft and the die plungers, and means partly controlled from the keys and partly controlled by the power shaft for determining the time of operation of the said connections, which operation takes place from the power shaft when the key is held depressed and the shaft reaches a certain point in its revolution, substantially as described.

7. In combination a die carrier, key operated stops on the frame, die operating plungers, a shaft, a connector between the die operating plungers and the shaft normally in inactive position but transmitting the power to the plungers from said shaft when in operative position, and a controller movably mounted on the die carrier and moved by contact with the stops, and a device actuated by the shaft to effect the setting of the connector in operative position to actuate the plungers when a key is properly pressed, substantially as described.

8. In combination die carrier means, die operating plungers, a shaft, a transmitting member operated by the shaft, a normally inactive connector between the transmitting member and the die plungers for operating them, key operated stops on the frame, a controlling member on the carrier to contact with the key operated stops and have limited movement under the impact, connections between the controlling member and the connector, a device moving in time with the shaft, said connector being set in operative position by the combined action of the controlling member and the said device for transmitting power from said transmitting member to the die plungers, substantially as described.

9. In combination die carrier means, key operated stops for arresting the die carrier, die plungers, a power shaft, connections between the power shaft and the die plungers for operating the latter, but normally disconnected from the power shaft, and means for setting the said connections to be operated from the shaft, said means including devices operated when the carrier is arrested, and a device operated by the power shaft and becoming effective at a certain point in the revolution of said shaft, substantially as described.

10. In combination a die carrier, die operating plungers, a driving shaft, a connector between the driving shaft and the plungers for transmitting the power from the shaft thereto, said connector being normally inactive, a detent for holding the connector inactive, key operated stops for the die carrier, connections tending to withdraw the detent from the connector when the die carrier is arrested, and a device operated by the shaft to contact with the connector, and render the connections effective in releasing the detent and connector to thereby set the connector in operative position for the transmittal of power from the shaft to the die plungers, substantially as described.

11. In combination a die carrier, key operated stops for arresting the die carrier, die plungers, a power shaft, a reciprocating member operated from the shaft, a connector to transmit power from said reciprocating member to the die plungers, normally inactive, connections set in operation when the die carrier is arrested tending to effect the setting of the connector in operative position, and a device on the reciprocating member coöperating with the said connections for setting the connector in operative position, substantially as described.

12. In combination a die carrier, key operated stops for arresting the carrier, die plungers, a power shaft, a connector between the power shaft and the die plungers for transmitting the power of said shaft thereto, a detent for holding the connector in inoperative position, connections set in operation when the die carrier is arrested for placing said detent under tension to withdraw the same, and a device operated from the shaft and acting upon the connector to effect its release from the detent, and its setting in operative position to transmit the power from said shaft, substantially as described.

13. In combination a die carrier, key operated stops for arresting the same, a power shaft, die operating plungers, a reciprocating cross head operated from the power shaft, a connector between the cross head and the die plungers for operating the same, said connector being pivotally supported, a detent engaging the connector and normally locked thereto, connections operated when the die carrier is arrested for placing a releasing tension on the detent, and a device on the cross head for operating the connector to allow the detent to free itself therefrom and the positioning of the connector for its operation by the cross head, substantially as described.

14. In combination a die carrier, key operated stops for arresting the same, die plungers, a power shaft, a connector between the power shaft and the plungers for transmitting the power of the shaft thereto, a detent interlocking with a tooth on the connector, a spring for holding the parts in engagement, connections operated when the carrier is arrested including a spring for placing the detent under releasing tension, a transmitting member operated by the shaft to operate the connector when the latter is released from the detent, and a device moving with the transmitting member to act on the connector to release it from the detent and thereby set the same in operative position, substantially as described.

15. In combination a die carrier, key operated stops for arresting the same, die plungers, a lower lever for operating the lower die plunger, a lever for operating the upper die plunger, a connecting rod between the upper and lower levers, a connector at the lower end of the said rod, a power shaft, a reciprocating transmitting member to act upon the connector, said connector being normally inactive, a detent for holding the connector inactive, and connections operating when the die carrier is arrested, together with a device moving in time with the transmitting member for effecting the release of the connector and its setting in operative position for the transmittal of power to the die plungers, substantially as described.

16. In combination a die carrier, key operated stops for arresting the same, die plungers, a carriage for the blank to be embossed, a pawl and ratchet feed for said carriage, a power shaft, a connector between the power shaft and the die plungers, a reciprocating member operated from the power shaft and with which the connector engages when released, detent means for holding the connector inactive, connections for operating the detent means when the die carrier is arrested, and connections between the connector and the pawl and ratchet feed of the carriage for operating the same, substantially as described.

17. In combination a die carrier, key operated stops for arresting the same, die plungers, a plate carriage, a pawl and ratchet device for feeding the carriage step by step, a power shaft, a connection between the power shaft and the pawl and ratchet device, including a spring, and a space key for preventing the movement of the pawl and ratchet feed, said space key operating a stem or stop, the said spring yielding when the stop is in action, substantially as described.

18. In combination with the die carrier, key operated stops for arresting the same, a carriage feed including a pawl and ratchet, a rod connected with the pawl for operating the same, a power shaft, a cam on the said shaft, a lever operated by the cam and connected with the rod to operate the pawl for its feeding stroke, a reciprocating member operated from the shaft, and a connection operated by said reciprocating member for giving the pawl its retracting stroke, substantially as described.

19. In combination in apparatus of the class described, a rotary die carrier, dies thereon, means for operating the dies, arresting stops for the die carrier, a friction drive, and means for relieving the pressure between the members of the friction drive when the die carrier is arrested, substantially as described.

20. In combination in apparatus of the class described, a rotary die carrier, dies thereon, means for operating the dies, arresting stops for the die carrier, a friction drive, and means for relieving the pressure between the members of the friction drive when the die carrier is arrested, said means including an alinement detent which is thrown into engagement with the die carrier as the same is arrested, substantially as described.

21. In combination in apparatus of the class described, a die carrier having a friction drive member thereon, a coöperating friction drive member engaging the first friction drive member and arranged coaxially of the die carrier, an annular toothed alining portion on the die carrier, arresting means for the die carrier, and a detent with means for throwing the same into engagement with the alining portion of the die carrier when the same is arrested, said detent exerting force in a direction parallel with the axis of the die carrier to relieve pressure between the friction members, substantially as described.

22. In combination a die carrier, dies thereon, means for operating the dies, arresting stops for the die carrier, a friction drive surrounding the die carrier shaft, said friction drive including a sleeved member surrounding said shaft, a spring for pressing the shaft for exerting pressure between the friction drive members, and a ball bearing between the spring and the sleeve member, substantially as described.

23. In combination in apparatus of the class described, a rotary die carrier, a series of stop pins with means for moving them into position for arresting the die carrier, die operating means, and automatically operating means on the die carrier with an operating connection leading thereto for returning the arresting stops to normal position, substantially as described.

24. In combination in apparatus of the class described, a rotary die carrier, a series of stop pins with means for moving them into position for arresting the die carrier, die operating means, and automatically operating means on the die carrier with an operating connection leading thereto for returning the arresting stops to normal position, and detent means for then holding the die carrier in the position in which the die carrier is arrested by the stops, substantially as described.

25. In combination in apparatus of the class described, a rotary die carrier, a series of stop pins with means for moving them into position for arresting the die carrier, die operating means, automatically operating means on the die carrier for returning the arresting stops to normal position, an operating connection for actuating the same, and detent means for holding the die carrier in the position in which the die carrier is arrested by the stops, said detent means engaging teeth on the die carrier to aline the same, substantially as described.

26. In combination a rotary die carrier, dies thereon, means for operating the dies, which means is normally inactive, arresting stops for the die carrier, a controller for causing the actuation of the die operating means when the die carrier is arrested, a power shaft, and means operated by said power shaft for returning the arresting stops to inactive position when the die carrier is arrested, substantially as described.

27. In combination a rotary die carrier, dies thereon, means for operating the dies, which means is normally inactive, arresting stops for the die carrier, a controller for causing the actuation of the die operating means when the die carrier is arrested, and means for returning the arresting stops to inactive position when the die carrier is arrested, said returning means having connection with the die operating means to be actuated thereby, substantially as described.

28. In combination in apparatus of the class described, a rotary die carrier, stops for arresting the same, a member on the die carrier for returning said stops to inactive position, die operating mechanism, a controller mounted on the die carrier for controlling the die operating mechanism, and connections between the die operating mechanism and the said stop returning member for actuating the same when the die carrier is arrested, substantially as described.

29. In combination a rotary die carrier, stops for arresting the same, a member mounted on the die carrier for returning the stops to inactive position, and a connection extending axially of the die carrier for operating said stop returning member, and means for operating the said connection when the die carrier is arrested, substantially as described.

30. In combination a rotary die carrier, dies thereon, plunger means for operating the dies, lever mechanism for operating the plunger means, arresting stops for the die carrier, a stop returning member mounted on the die carrier, a rod arranged axially of the die carrier for operating the stop returning means, said rod being connected with the lever mechanism which operates the plunger means, a controller mounted on the die carrier to engage the arresting stops, and connections extending from the said controller for controlling the actuation of the lever mechanism, substantially as described.

31. In combination a die carrier, stop pins for arresting the die carrier, a depressor on the carrier for returning the stop pins to normal position, die operating means, and a lever connected with and operated by the die operating means for operating the depressor, substantially as described.

32. In combination a die carrier, stop pins for arresting the die carrier, a depressor on the carrier for returning the stop pins to normal position, die operating means, and a lever connected with and operated by the die operating means for operating the depressor, said die operating means including a lever, upon which the depressor operating lever is mounted, the latter lever having a stem working in a part of the frame to move the latter lever on its pivot as the die operating lever moves, substantially as described.

33. In combination a die carrier, dies thereon, stops for arresting the die carrier, die operating mechanism, means for returning the stops to normal position, a detent for holding the carrier in its arrested position, a controller on the die carrier to engage the stops, means for returning the stops, connections operated by said controller for controlling the operation of the die operating means, the detent, and the stop returning means, substantially as described.

34. In combination a die carrier, dies thereon, die operating means, stops for arresting the carrier, stop returning means with connections for operating the same when the die carrier is arrested, a detent for the die carrier, and means for throwing the same into action as the stop returning means is operated, substantially as described.

35. In apparatus of the class described, a rotary carrier for the dies, means for operating the dies, a carriage for the blanks, spacing mechanism for the carriage, a pair of stop pins one on each side of the machine, and a space key with a connection to the stop pins for raising them simultaneously into position for arresting the carrier, substantially as described.

36. In combination a rotary carrier, dies thereon having blank spaces between them at opposite sides of the carrier, a pair of spacing stop pins, a carriage for the blank, spacing mechanism for the carriage, means for operating the die carrier, and means for operating the spacing stop pins, substantially as described.

37. In combination die carrier means, die plungers, a power shaft, normally inactive power transmitting connections between the power shaft and the die plungers, means partly manually controlled and partly controlled by the power shaft for determining the time of operation of said connection, which operation takes place from the power shaft when the manual control is exerted and the shaft reaches a certain point in its revolution, substantially as described.

38. In combination a die carrier, die operating plungers, a shaft, a connector between the die operating plungers and the shaft normally in inactive position, but transmitting the power to the plungers from said shaft when in operative position, a manually controlled connection together with a device actuated by the shaft to effect the setting of the connector in position to be operated from the shaft to actuate the plungers, substantially as described.

39. In combination a die carrier, die operating plungers, a driving shaft, a connector between the driving shaft and the plungers for transmitting the power from the shaft thereto, said connector being normally inactive, a detent for holding the connector inactive, a manually controlled connection tending to withdraw the detent from the connector, and a device operated by the shaft to contact with the connector and render the connections effective in releasing the detent and connector to thereby set the connector in operative position for the transmittal of power from the shaft to the die plungers, substantially as described.

40. In combination a die carrier, die plungers, a power shaft, a reciprocating member operated from the shaft, a connector to transmit power from said reciprocating member to the die plungers normally inactive, and a manually controlled connection tending to effect the setting of the connector in operative position, said reciprocating member coöperating with the said connection for setting the connector in operative position, substantially as described.

41. In combination a die carrier, die plungers, a power shaft, a connector between the power shaft and the die plungers for transmitting the power of said shaft thereto, a detent for holding the connector in inoperative position, a manually controlled connection for placing a releasing tension on the detent, and a device operated from the shaft and acting upon the connector to effect its release from the detent, and its setting in operative position to transmit the power from said shaft, substantially as described.

42. In combination a die carrier, die plungers, a lower lever for operating the lower die plunger, a lever for operating the upper die plunger, a connecting rod between the upper and lower levers, a connector at the lower end of said rod, a power shaft, a reciprocating transmitting member operated from the power shaft to act upon the connector, said connector being normally inactive, a detent for holding the connector inactive, a manually controlled connection coöperating with the transmitting member for effecting the release of the connector, and its setting in operative position for the transmittal of power to the die plungers, substantially as described.

In testimony whereof, I affix my signature in presence of two witnesses.

ULYSSES G. LEE.

Witnesses:
WALTER DONALDSON,
EDWIN S. CLARKSON.